United States Patent
Caldwell et al.

(10) Patent No.: US 6,647,057 B1
(45) Date of Patent: Nov. 11, 2003

(54) LINK ADAPTER INTERFACE FOR UPGRADING EXISTING SATELLITE COMMUNICATION SYSTEM FOR ENHANCED MODULATION AND CODING

(75) Inventors: Henry Scott Caldwell, Melbourne Beach, FL (US); Charles Raymond Burr, Jr., Palm Bay, FL (US)

(73) Assignee: International Communications Products, Inc., Melbourne, FL (US)

( * ) Notice: Subject to any disclaimer, the term of this patent is extended or adjusted under 35 U.S.C. 154(b) by 0 days.

(21) Appl. No.: 09/185,353

(22) Filed: Nov. 3, 1998

Related U.S. Application Data

(60) Provisional application No. 60/064,049, filed on Nov. 3, 1997.

(51) Int. Cl.[7] ............................................... H04B 25/28
(52) U.S. Cl. ..................................... 375/220; 214/220
(58) Field of Search ................................ 375/220, 214, 375/316, 321

(56) References Cited

U.S. PATENT DOCUMENTS

| | | | |
|---|---|---|---|
| 4,567,591 A | 1/1986 | Gray et al. ............... 370/109 |
| 4,660,196 A | 4/1987 | Gray et al. ............... 370/109 |
| 4,750,167 A | 6/1988 | Meyer ........................ 370/77 |
| 5,315,583 A | 5/1994 | Murphy et al. .............. 370/18 |
| 5,333,155 A | 7/1994 | Dambacher ................. 375/122 |
| 5,406,551 A | 4/1995 | Saito et al. .................... 370/19 |
| 5,434,847 A | 7/1995 | Kou ............................. 370/17 |
| 5,463,656 A | 10/1995 | Polivka et al. ............... 375/200 |
| 5,465,396 A | 11/1995 | Hunsinger et al. ............ 455/61 |
| 5,469,452 A | 11/1995 | Zehavi ........................ 371/43 |
| 5,483,529 A | 1/1996 | Baggen et al. ................ 370/70 |
| 5,521,943 A | 5/1996 | Dambacher ................. 375/295 |
| 5,550,812 A | 8/1996 | Philips ........................ 370/19 |
| 5,557,647 A | 9/1996 | Kushige et al. ............. 375/371 |
| 5,574,964 A | * 11/1996 | Hamlin ........................ 725/78 |
| 5,610,908 A | 3/1997 | Shelswell et al. ........... 370/210 |
| 5,734,853 A | * 3/1998 | Hendricks et al. .......... 345/716 |
| 5,781,542 A | 7/1998 | Tanaka et al. .............. 370/342 |
| RE35,954 E | * 11/1998 | Levine ........................ 380/10 |

\* cited by examiner

*Primary Examiner*—Stephen Chin
*Assistant Examiner*—Kevin Kim
(74) *Attorney, Agent, or Firm*—Allen, Dyer, Doppelt, Milbrath & Gilchrist, P.A.

(57) ABSTRACT

The standard BPSK modulation and encoding mechanisms employed by the head end of a satellite-linked DATS communication system are replaced with digital video broadcast standard QPSK modulation and Viterbi/Reed-Solomon error correction encoding that are effective to provide significantly improved link performance. Each downlinked receiver site is retrofitted with a front end link adapter interface that is operative to demodulate the link-efficient, replacement modulation and coding to baseband, and then convert the demodulated and MPEG-based packetized baseband signals into an original TDM aggregate baseband signal which is then remodulated and encoded into the communication protocol used by the existing non-upgraded receiver, so that the in-place receiver may demodulate the signal.

25 Claims, 3 Drawing Sheets

LINK ADAPTER INTERFACE FOR UPGRADING EXISTING SATELLITE COMMUNICATION SYSTEM FOR ENHANCED MODULATION AND CODING

CROSS-REFERENCE TO RELATED APPLICATION

The present application claims the benefit of U.S. Provisional Application No. 60/064,049 filed Nov. 3, 1997.

FIELD OF THE INVENTION

The present invention relates in general to communication systems, and is particularly directed to a method and arrangement for improving link bandwidth efficiency and power usage of a satellite communication system, by replacing the modulation and encoding mechanisms employed by the head end of the system with enhanced modulation and encoding schemes, and augmenting each receiver site with a front end link adapter interface that demodulates the replacement modulation and coding, and reconverts the communication protocol of the enhanced link into the original protocol for demodulation by a non-upgraded receiver.

BACKGROUND OF THE INVENTION

The substantially increased levels of link performance that have evolved from ongoing improvements in communication signal processing technology will eventually drive communication system service providers to the conclusion that at least some if not all of their equipment must be replaced or upgraded. Where the number of components of an existing system infrastructure is relatively large, as may occur in the case of a satellite broadcast system, for example, conducting a wholesale replacement of all of the existing receivers with newer, higher performance components is effectively cost-prohibitive. In the satellite communication system illustrated diagrammatically in FIG. 1, broadcast signals are uplinked from a head end terminal site 10 through a satellite 20 and are typically downlinked to hundreds or thousands of remote earth terminal sites 30.

SUMMARY OF THE INVENTION

In accordance with the present invention, this replacement cost problem is successfully addressed by substituting the modulation and encoding mechanisms employed by the head end of a communication system (such as a satellite-linked DATS system) with a combined, enhanced modulation and encoding scheme that is effective to provide significantly improved link performance in terms of bandwidth efficiency and/or power usage. In addition, each downlinked receiver site is retrofitted with a front end link adapter interface that is operative to demodulate the link-efficient, replacement modulation and coding to baseband, and then reconvert the demodulated baseband signals back into the original modulation and encoding protocol used by the existing non-upgraded receiver, so that the in-place receiver may demodulate the signal.

To this end, at the head end terminal, a plurality of digitized TDM baseband channels such as those supplied from network studio sites, that are typically but need not be multiplexed into an aggregate baseband serial bit stream. This aggregate bit stream is then converted into packetized format by an MPEG (motion picture expert group) II protocol converter. The MPEG-converted packetized data is then modulated for transport over the link by a high performance modulation and encoding mechanism. In a preferred embodiment, this mechanism comprises a digital video broadcast (DVB) modulator that performs QPSK modulation and enhanced FEC encoding in the form of concatenated Viterbi/Reed-Solomon encoding.

By high performance or enhanced modulation and encoding is meant that it provides substantial reduction in link bandwidth usage and/or power by the modulator, so that for the same or improved BER, the bandwidth efficiency of the link is increased, and/or at a lower power requirement. Because of the two to one improvement provided by QPSK modulation, and the improved BER afforded by the concatenated Viterbi/Reed-Solomon encoding, DVB modulation provides a very practical mechanism for realizing these objectives. In addition, DVB modulation provides for operation at data rates up to 60 Mbps, so that transmission rates well in excess of a conventional DATS system are available.

The QPSK-modulated and FEC encoded signal is transmitted by existing up-conversion and transmission equipment over an uplink RF channel to the satellite transponder. The satellite transponder broadcasts the DVB modulated signal over its downlink channel to a plurality of remote earth terminal sites. In order to receive the DVB signal, a respective remote terminal is augmented to incorporate a front end link adapter interface that is installed between its wideband RF receiver and the in-place DATS demodulator. A first embodiment of the link adapter interface includes a DVB demodulator that performs QPSK demodulation and Viterbi/Reed-Solomon decoding of the received signal, and outputs a baseband signal having the same MPEG II packetized format as applied to the DVB modulator at the head end.

To make this signal compatible with the existing DATS receiver equipment, it is reformatted and remodulated by means of an MPEG-to-DATS protocol converter, which strips off the transport overhead and reassembles the packets into an aggregate multi-T1 baseband digital bit stream, that corresponds to the input to the MPEG II protocol converter in the upgraded head end equipment. The aggregate multi-T1 baseband digital bit stream is then coupled to an FEC encoder which performs the same FEC encoding mechanism that had been previously performed by the DATS baseband processing unit of the replaced head end. The output of the FEC encoder is then remodulated back into DATS BPSK to provide the DATS demodulator of the existing receiver equipment with exactly the same type of signal it expects to receive from the wideband RF amplifier.

In addition to being coupled to an FEC encoder, the aggregate multi-T1 baseband digital bit stream output from the MPEG II protocol converter may also be coupled directly to the baseband processing section of a DATS receiver that is configured to accept a baseband input.

A second embodiment of the link adapter interface is configured to accommodate the situation where the network service provider is in the process of replacing the conventional DATS head end equipment with upgraded DVB head end equipment. The second embodiment is configured to continue to provide a default connection from the RF receiver output to the DATS receiver equipment. However, when the link adapter detects that the upgraded head end equipment is operational, it automatically switches in the functionality of the augmented receiver of the first embodiment.

A third embodiment of the link adapter is configured to accommodate the replacement of the DATS receiver with a DVB receiver. In this third embodiment, a demultiplexer is installed at the output of the DVB demodulator and has a first output ported to the MPEG-to-DATS protocol converter and a second output ported directly to a DVB-compatible receiver. The steering path through the demultiplexer provides either a remodulation DATS path, as in the case of a standard DATS receiver, or a path for direct DVB baseband processing of the output of the DVB demodulator by a DVB—MPEG II compatible receiver.

DETAILED DESCRIPTION

Figure 1:
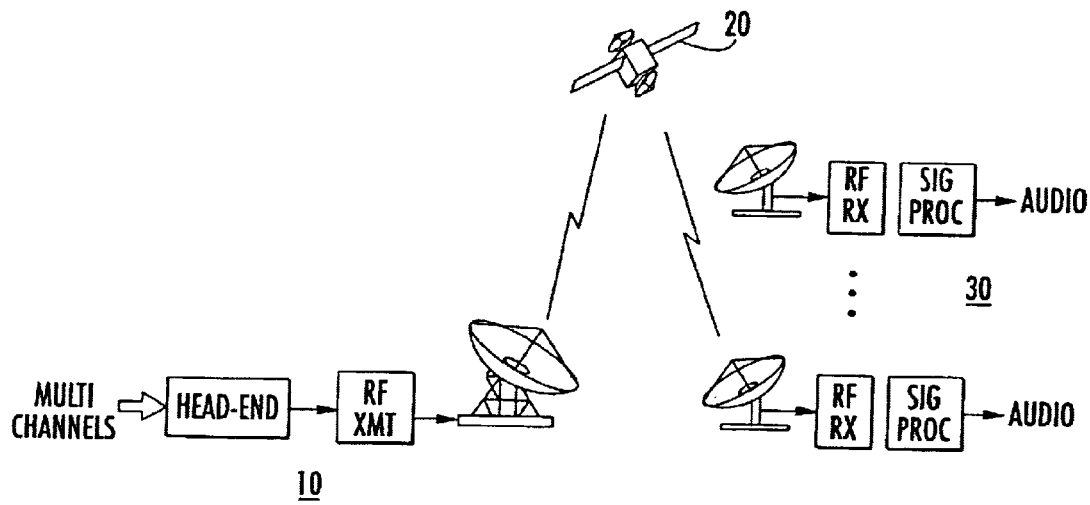
FIG. 1 diagrammatically illustrates a satellite broadcast system.

Before describing in detail the new and improved satellite communication system modulation and encoding mechanism of the invention, it should be observed that the present invention resides primarily in what is effectively a prescribed arrangement of conventional communication circuits and associated digital signal processing components and attendant supervisory control circuitry therefor, that controls the operations of such circuits and components. Consequently, the configuration of such circuit components and the manner in which they are interfaced with other satellite communication system equipment have, for the most part, been illustrated in the drawings by readily understandable block diagrams, which show only those specific details that are pertinent to the present invention, so as not to obscure the present disclosure with details which will be readily apparent to those skilled in the art having the benefit of the description herein. Thus, the block diagrams are primarily intended to show the major components of the system in a convenient functional grouping, so that the present invention may be more readily understood.

In order to facilitate an appreciation of the selective modulator and encoding upgrade provided by the present invention, it is initially useful to examine the architecture of the head end signal processing equipment of a conventional satellite broadcast system, such as a digital audio transmission system (DATS) that has been employed for a number of years by commercial network service providers to furnish a variety of communication services (such as audio and data) to a large number (e.g., hundreds or thousands) of remote station sites geographically distributed over a wide terrestrial area. The conventional DATS system is designed to confine the signal spectrum within approximately a 17 MHz band, centered between the terrestrial interference bands, which allows filtering of the terrestrial interferers without degrading the DATS signal.

Figure 2:
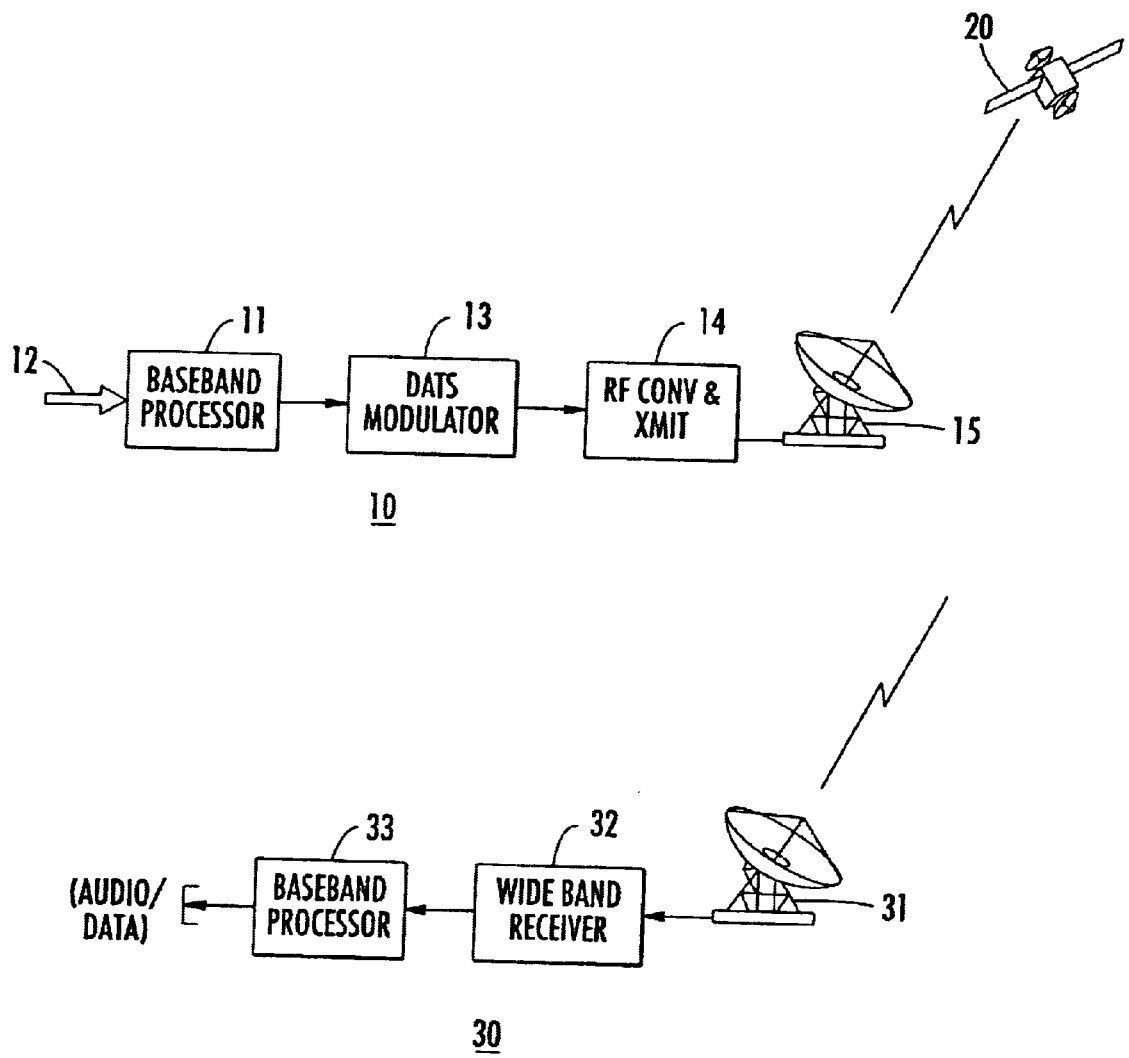
FIG. 2 diagrammatically illustrates the configurations of conventional DATS head end and remote terminal sites of the satellite broadcast system of FIG. 1.

For this purpose, as diagrammatically illustrated in FIG. 2, the equipment of a conventionally configured DATS head end site 10 customarily includes a baseband processing unit 11, that is operative to multiplex and encode a multiplicity of digitized time division multiplexed (TDM) baseband (e.g., T1=1.536 Mbps) channels 12, such as multiple digitized audio channels supplied from a plurality of studio sites served by the head end, into a composite output bit stream for application to a head end DATS modulator 13.

As a non-limiting parametric example, baseband processing unit 11 may multiplex five sets of T1 links into a 7.68 Mbps data rate output bit stream. This multiplexed baseband bit stream is typically subjected (although not necessarily as in the case of older systems) to some form of forward error correction (FEC) encoding mechanism, and then forwarded to a DATS modulator 13. The DATS modulator 13 modulates the (encoded) baseband signal in accordance with a prescribed modulation (binary phase shift keying (BPSK)) and applies the BPSK-modulated signal to up-conversion (to C-band) and transmission equipment 14. Via an associated antenna 15, the transmission equipment 14 transmits a BPSK-modulated RF signal over an uplink channel to the satellite transponder 20, which relays/broadcasts the signal over a downlink channel to receiver terminals installed at the remote earth terminal sites 30.

The receiver equipment of each of the receiver terminals includes a signal recovery processing path that is complementary to that installed at the head end site 10. This signal recovery processing path includes an antenna 31, an associated wideband RF receiver 32 that contains an RF-downconverter, DATS demodulator (and FEC decoder where applicable), and a baseband signal processing unit 33 that includes demultiplexing circuitry and associated decoders for deriving the original digitized baseband signals (audio/data). For further details regarding the configuration of such a conventionally configured satellite communication system, attention may be directed to the U.S. Patents to Gray et al, U.S. Pat. Nos. 4,567,591 and 4,660,196.

Now although conventional DATS satellite communication systems of the type shown in FIG. 2 have served the needs of their users for a period of time on the order of two decades, they have a fundamental shortcoming—they are aged and rapidly becoming functionally obsolete in terms of the current state of the art. As such, they are not currently capable of providing the substantially increased levels of performance that are realizable by present day digital modulator and error correction signal processing technology. Indeed, modulation and demodulation technology has progressed to the stage that it is now possible to implement all such signal processing functions digitally. This not only enables drift-free and adjustment-free operation over extended periods of time (years), but provides a BER performance that effectively approximates that of the theory of phase shift keyed (PSK) modulation.

In addition, advances in large scale integrated circuits (LSIs) and forward error correction signal processing technology have made it possible to provide standardized digital signal processing chips sets that contain very complex and powerful enhanced FEC techniques, such as concatenated Viterbi/Reed-Solomon encoding-decoding algorithms, as a non-limiting example. These enhanced encoding-decoding schemes are capable of achieving essentially error free operation at Eb/No ratios above a bit error rate (BER)

threshold. As a consequence, they have been incorporated into both U.S. digital television standards and the European digital video broadcast (DVB) standard, which provides for operation at data rates up to approximately 60 Mbps.

As noted above, although one way to take advantage of this enhanced technology is to replace the head end equipment and the receiver equipment at each of the remote terminal sites, from a quantitative standpoint of the large number of receiver sites, such a wholesale replacement is cost-prohibitive to the network service provider. To circumvent this problem, the present invention provides a performance-upgrading alternative that involves substituting the modulation and encoding mechanisms of only the head end equipment. The receiver site equipment is not replaced; instead it is augmented by installing a front end link adapter interface between the RF receiver and the (DATS) demodulator equipment.

This auxiliary link adapter interface is operative to demodulate and decode the enhanced modulation and encoding mechanism performed by the replacement equipment at the head end transmit site, and then reconvert the demodulated communication protocol back into the original protocol used by the in-place demodulator and downstream signal processing components of the receiver. No modification of the receiver's demodulator and associated downstream signal processing (decoding) equipment is required. In effect, the front end link adapter interface 'spoofs' the receiver into thinking that the upgraded (bandwidth and power usage enhanced) link is a conventional DATS link.

Figure 3:
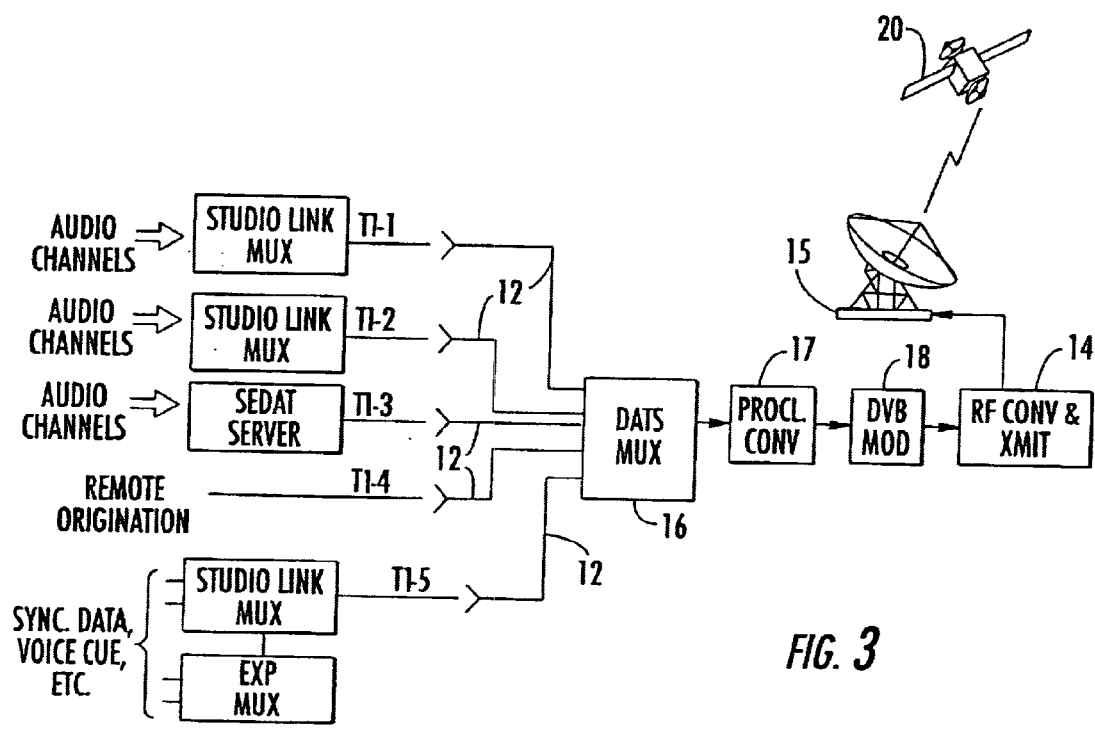
FIG. 3 diagrammatically illustrates the modification of the head end of the satellite broadcast system of FIG. 2, to incorporate enhanced modulation and encoding in accordance with the present invention.

The manner in which the head end site of the system of FIG. 2 may be modified to incorporate enhanced modulation and encoding in accordance with the present invention is diagrammatically illustrated in FIG. 3. As shown therein, as in the conventional DATS architecture of FIG. 2, plural digitized TDM T1 baseband channels 12, such as those supplied from a plurality of network studio sites, are multiplexed into a composite (7.68 Mbps data rate) output baseband serial bit stream by a DATS multiplexer 16 of the type employed by the baseband processing unit 11 of the DATS system of FIG. 2.

Rather than being coupled to a DATS modulator, however, the aggregate TDM baseband serial bit stream is applied to an MPEG (motion picture expert group) II protocol converter 17. MPEG II converter 17 converts the composite multi-T1 baseband digital bit stream into packetized format (with attendant MPEG transport overhead), using MPEG II transport protocol. The MPEG-converted packetized data is then applied to a high performance modulator 18. Modulator 18 may perform QPSK modulation, MSK, QAM or other types of modulation, plus enhanced FEC encoding, such as concatenated Viterbi/Reed-Solomon encoding utilizing a Viterbi encoding rate such as ½, ¾, ⅞, etc., sequential, or other advanced encoding mechanisms to improve bandwidth usage.

For this purpose, as a non-limiting, but preferred example, modulator 18 may comprise a DVB modulator that performs QPSK modulation and concatenated Viterbi/Reed-Solomon encoding. The QPSK-modulated and FEC encoded signal produced by DVB modulator is then coupled to the existing up-conversion (to C-band) and transmission equipment 14 installed at the head end site, for transmission over an uplink RF channel to the satellite transponder 20, as described above.

The installation of such an enhanced modulation and FEC encoding mechanism between the digitized data sources and the RF transmission equipment at the head end site makes it possible to transmit a signal at a higher data rate (e.g. twice the data rate or 15.36 Mbps) within a bandwidth of approximately 15 MHz, namely within the 17 MHz bandwidth of a conventional DATS system. While QPSK modulation and concatenated Viterbi/Reed-Solomon encoding of a DVB modulator provide a preferred and practical (readily available chip set) mechanism for realizing a substantially improved performance link, it is to be understood that the present invention is not limited to this or any other link performance upgrading scheme.

What is important is that the selected modulation and encoding provide substantial reduction in link bandwidth usage and power by the modulator, so that for the same or improved BER, bandwidth efficiency is improved and/or at a lower power requirement. Because of the two to one improvement provided by QPSK modulation, and the improved BER afforded by the concatenated Viterbi/Reed-Solomon encoding, the bVB standard provides a very practical mechanism for realizing these objectives. Moreover, as noted above, the DVB standard provides for operation at data rates up to 60 Mbps, so that transmission rates considerably in excess of a conventional DATS system are afforded.

Advantageously, the use of such enhanced modulation (QPSK) and encoding and spectral filtering enables the upgraded system to provide communication transport service within roughly only half the bandwidth and power currently required by the conventional system configuration of FIG. 2. For the present example of a 7.68 Mbps data rate TDM aggregate signal, the bandwidth required is only on the order of 7 to 8 MHz. Essentially error-free reception is now possible at an Eb/No of only 5 to 6 db, rather than at the 10 to 11 dB level required for the DATS system of FIG. 2. The system of FIG. 3 can achieve a lower BER than the system of FIG. 2, at about one-quarter of the transmit power.

Figure 4:
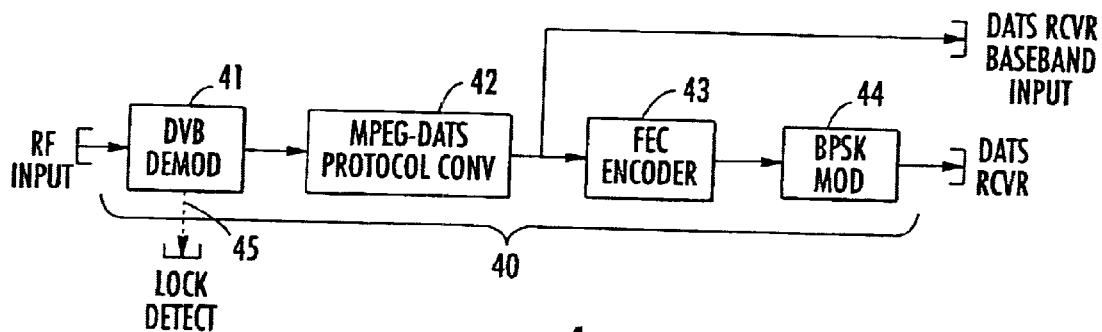
FIG. 4 diagrammatically illustrates the signal processing architecture of a first embodiment of a link adapter interface that is installed upstream of a conventional DATS receiver.

FIG. 4 diagrammatically illustrates the signal processing architecture of a first embodiment of a front end link adapter interface 40 that is installed between the in-place wideband RF receiver 32 and the baseband DATS signal processing unit 33 of a respective one of the receiver terminals of the remote earth terminal sites 30. For the present example of using DVB modulation as the enhanced modulation mechanism, the front end link adapter interface 40 includes a DVB demodulator 41, to which the output of the RF receiver amplifier circuitry is coupled. The DVB demodulator 41 performs QPSK demodulation and Viterbi/Reed-Solomon decoding of the received signal to output a baseband signal having the same MPEG II packetized format as applied to the (DVB) modulator 18 at the head end.

Because this signal is not compatible with the existing receiver equipment, it must be reformatted and remodulated to conform with the original DATS BPSK format. For this purpose, the output of DVB demodulator 41 is coupled to an MPEG-to-DATS protocol converter 42, which strips off the MPEG II transport overhead and reassembles the MPEG II packets into an aggregate multi-T1 baseband digital bit stream. Namely, the baseband digital bit stream at the output of protocol converter 42 is exactly the same as that provided to the protocol converter 17 in the upgraded head end equipment of FIG. 3, and which would have been coupled to DATS modulator 13 of the conventional system of FIG. 2. A DATS receiver that is configured to accept a baseband input may be directly coupled to the baseband digital bit stream at the output of protocol converter 42.

Where the replaced head end is one which employed FEC encoding, the aggregate multi-T1 baseband digital bit stream output by protocol converter is coupled to an FEC encoding chip 43 which performs the same FEC encoding mechanism that had been previously performed by the baseband processing unit 11 of the replaced head end of FIG. 2. If no FEC encoding had been employed (as in some older systems, as noted above), the FEC encoding chip is not employed.

For the case of a typical head end performing FEC encoding, the output of the FEC encoding chip 43 is remodulated into DATS BPSK format by modulator 44, so as to provide the DATS demodulator of the existing receiver equipment with exactly the same type of signal it is accustomed to being provided by the RF amplifier. Because of their reduced signal processing complexity and the ready availability of low cost, standardized LSI chip sets, FEC encoding chip 43 and BPSK modulator 44 do not add substantial cost to the receiver upgrade.

As pointed out above, of particular significance is the fact that the combined enhanced (DVB) modulation and FEC encoding mechanism of the present invention enables signal transmission at twice the current data rate and well within the bandwidth of a standard DATS system, so that communication transport service can be provided at considerably less than the transmit power currently required by the conventional system of FIG. 2. In addition, a principal difference between what the DATS receiver is accustomed to receiving and what the modulator actually provides to the receiver is the fact that the signal-to-noise ratio of the signal supplied to the DATS receiver is now considerably higher than in the conventional system of FIG. 2, as the output of the modulator 44 is supplied to the DATS receiver in a noise-free environment, so that the DATS receiver will provide a higher quality output signal. As noted previously, for the same data rate (7.68 Mbps), the upgraded system of FIGS. 3 and 4 can achieve a lower BER than the system of FIG. 2, at about one-quarter of the transmit power.

Figure 5:
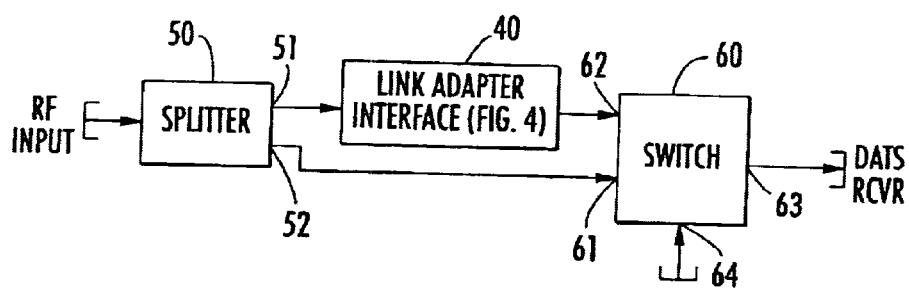
FIG. 5 diagrammatically illustrates the signal processing architecture of a second embodiment of a link adapter interface installed for automatically inserting the functionality of the augmented receiver embodiment of FIG. 4 between a wideband RF receiver and the DATS receiver.

FIG. 5 diagrammatically illustrates the signal processing architecture of a second embodiment of a front end link adapter interface that may be installed at the receiver site, to accommodate the situation where the network service provider is in the process of, but has not yet completed, replacing the head end equipment with that of the upgraded head end of FIG. 3, described above. During this changeover interval, the embodiment of FIG. 5 is operative to continue to provide a direct connection between the RF receiver output and the downstream DATS receiver equipment. However, once the upgraded head end equipment has been installed and is operational, the embodiment of FIG. 5 is operative to detect this occurrence and automatically switch in the functionality of the augmented receiver embodiment of FIG. 4.

For this purpose, the output of the RF receiver amplifier circuitry is coupled to a signal splitter 50, a first output 51 of which is coupled to DVB demodulator 41 of the front end link adapter interface 40 of FIG. 4, and a second output 52 of which is coupled to a first input port 61 of a switch 60. Switch 60 has a second input port 62 coupled to the output of the DATS BPSK modulator 44 of the front end link adapter interface 40 of FIG. 4, and an output port 63 coupled to the DATS receiver. Switch 60 is operative to provide throughput connectivity between a selected one of its input ports 61, 62 to its output port 63 in accordance with a control signal applied to control port 64. Control port 64 is coupled to the lock-detect output port 45 of DVB demodulator 41.

In the absence of detecting a DVB-modulated signal, the state of the output port 45 of DVB demodulator 41 will cause switch 60 to provide a default connection between ports 61 and 63, so that the demodulation functionality of the link adapter interface 40 is bypassed. This ensures that, during the upgrade changeover interval, the output of the RF receiver will be directly connected to the DATS receiver equipment. However, once the upgraded DVB-based head end equipment has been installed and is operational, the DVB demodulator 41 will detect the DVB modulated signal and the lock detect output port 45 of DVB demodulator 41 will cause switch 60 to switch the connection to between ports 62 and 63, and thereby automatically insert the functionality of the augmented receiver embodiment of FIG. 4 between the wideband RF receiver and the DATS receiver.

Figure 6:
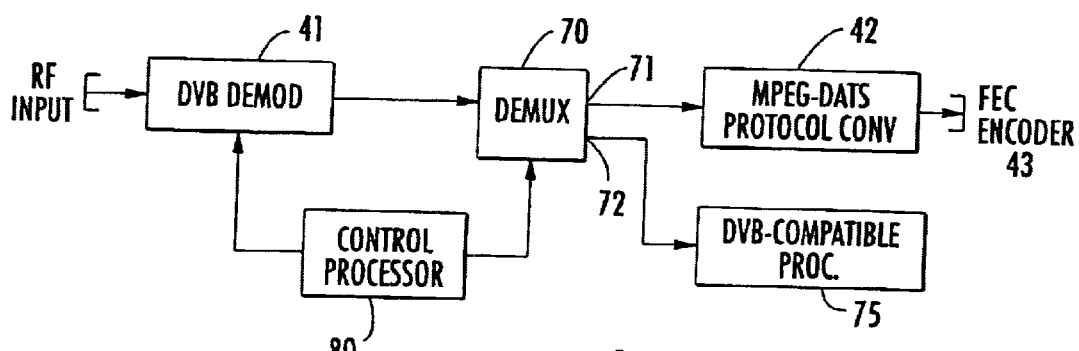
FIG. 6 diagrammatically illustrates the signal processing architecture of a third embodiment of a front end link adapter interface for a DATS receiver that also accommodates the installation of a DVB-compatible receiver.

FIG. 6 diagrammatically illustrates the signal processing architecture of a third embodiment of a front end link adapter interface, that may be installed at the receiver site to accommodate the eventual or current replacement of the DATS receiver with upgraded (DVB) receiver equipment, to which the output of the DVB demodulator 41 may be directly connected. To provide for this alternative connection, a demultiplexer 70 is installed at the output of the DVB demodulator 41. Demultiplexer 70 has a first output 71 ported to the MPEG-to-DATS protocol converter 42, and a second output 72 ported directly to a compatible baseband receiver or signal processor (such as a DVB-compatible receiver) 75. The steering path through the demultiplexer 70 is controlled by a control processor 80, so as to provide either a remodulation DATS path, as described above with reference to FIG. 4 for the case of a standard DATS receiver, or path that directly connects the output of the DVB demodulator 41 to a compatible baseband receiver or signal processor.

Because the actual (upgraded) link now uses performance-enhancing modulation and forward error correction signal processing techniques, such as quaternary phase shift keying (QPSK) and concatenated Viterbi/Reed-Solomon encoding decoding algorithms of DVB modulation, the robustness and channel capacity of the link is substantially increased (doubled to a data rate of 15.36 Mbps). This not only allows the network service provider to meet demands for new services (such as store-and-forward, downloading, file delivery, etc.) without having to incur space segment cost, and possibly even reducing this cost, but affords the network service provider the luxury of reselling the increased capacity to additional users.

As will be appreciated from the foregoing description, the present invention makes it possible to upgrade aging components of an existing satellite communication system in order to realize substantially increased levels of link performance provided by newer communication signal processing technology, but without the extreme expense of conducting a wholesale replacement of all of the existing receivers. only the head end components are replaced with an enhanced/upgraded signal processing subsystem, while downlinked receiver sites are retrofitted with a front end link adapter interface that is operative to demodulate the link-efficient, replacement modulation and coding employed by the head end replacement subsystem to baseband, and then reconvert the demodulated baseband signals back into the original modulation and encoding protocol used by the existing non-upgraded receiver, so that the existing receiver may demodulate the signal.

While we have shown and described several embodiments of the invention, it is to be understood that the same,is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. For use with a communication system, having a transmit site at which a baseband information signal has been modulated with a first type of digital phase modulation, to produce a first modulated signal for transmission over a communication link to a receiver site, said receiver site containing a receiver that is operative to demodulate and process said first modulated signal to derive said baseband information signal, a method of improving the utilization of said communication link comprising the steps of:

(a) at said transmit site, (a1) substituting said first type of digital phase modulation with a prescribed error correction encode mechanism and second type of digital phase modulation to produce a second modulated and encoded signal, said second type of digital phase modulation being effective to increase bandwidth efficiency and/or reduce power usage for the transport of said second modulated and encoded signal over said communication link relative to said first type of digital phase modulation, and (a2) processing said baseband information signal in accordance with said prescribed error correction encode mechanism and said second type of digital phase modulation to produce said second modulated and encoded signal that is transmitted over said communication link to said receiver site; and (b) at said receiver site, (b1) demodulating said second modulated and encoded signal in accordance with said second type of digital phase modulation and processing the demodulated signal in accordance with a prescribed error correction decode mechanism to derive an intermediate baseband signal representative of said baseband information signal, (b2) processing said intermediate baseband information signal in accordance with said first type of digital phase modulation to reproduce said first modulated signal, and (c) coupling said reproduced first modulated signal to said receiver, wherein said reproduced first modulated signal is demodulated in accordance with said first type of digital phase modulation and processed to derive said baseband information signal.

2. A method according to claim 1, wherein step (a2) comprises processing said baseband information signal in accordance with digital video broadcast (DVB) standard modulation.

3. A method according to claim 1, wherein said first type of digital phase modulation comprises binary phase shift keyed (BPSK) modulation and said second type of digital phase modulation comprises quaternary phase shift keyed (QPSK) modulation.

4. A method according to claim 1, wherein step (a2) comprises processing said baseband information signal in accordance with Viterbi and Reed-Solomon encoding, and QPSK modulation to produce said second modulated and encoded signal.

5. A method according to claim 1, wherein said receiver comprises a digital audio transmission system (DATS) receiver.

6. A method according to claim 1, wherein said baseband signal is comprised of an aggregate baseband serial bit stream containing a plurality of digitized time division multiplexed (TDM) baseband channels supplied from a plurality of baseband signal sources, and wherein step (a2) comprises packetizing said aggregate baseband serial bit stream in accordance with motion picture expert group (MPEG)-based transport protocol.

7. A method according to claim 6, wherein step (a2) comprises processing said packetized baseband information signal in accordance with digital video broadcast (DVB) standard modulation.

8. A method according to claim 6, wherein step (b1) comprises demodulating said second modulated and encoded signal by means of a DVB demodulator, and converting said packetized baseband signal to an aggregate baseband serial bit stream containing said plurality of digitized TDM baseband channels as said intermediate baseband signal.

9. A method according to claim 1, wherein, at said transmit site, said baseband information signal is modulated with said first type of digital phase modulation and processed in accordance with a first type of error correction encoding mechanism to produce a first modulated and encoded signal for transmission over said communication link to said receiver site, and wherein said receiver is operative to demodulate and process said first modulated and encoded signal to derive said baseband information signal, and wherein step (b2) comprises processing said intermediate baseband information signal in accordance with said first type of digital phase modulation and said first type of error correction encoding mechanism to reproduce said first modulated and encoded signal.

10. For use with a communication system, having a receiver that is operative to process a first modulated and encoded signal transmitted over a communication link in accordance with a first type of digital phase demodulation and error correction decode mechanism, to derive a baseband information signal, a method of processing signals applied to said receiver comprising the steps of:

(a) processing a received signal that has been transported over said communication link in accordance with a second error correction encode mechanism and second type of digital phase modulation that is effective to increase bandwidth efficiency and/or reduce power usage over said communication link relative to said first type of digital phase modulation, in accordance with a second error correction decode mechanism to derive an intermediate baseband signal representative of said baseband information signal;

(b) processing said intermediate baseband information signal in accordance with a first error correction encode mechanism and said first type of digital phase, modulation to reproduce said first modulated and encoded signal; and (c) coupling said reproduced first modulated and encoded signal to said receiver, wherein said reproduced first modulated and encoded signal is demodulated in accordance with said first type of digital phase modulation and processed in accordance with said first error correction decode mechanism to derive said baseband information signal.

11. A method according to claim 10, wherein said second type of digital phase modulation comprises digital video broadcast (DVB) standard modulation.

12. A method according to claim 10, wherein said first type of digital phase modulation comprises binary phase shift keyed (BPSK) modulation and said second type of digital phase modulation comprises quaternary phase shift keyed (QPSK) modulation.

13. A method according to claim 10, wherein said second error correction encode mechanism comprises Viterbi and Reed-Solomon encoding.

14. A method according to claim 10, wherein said receiver comprises a digital audio transmission system (DATS) receiver.

15. A method according to claim 10, wherein said baseband signal is comprised of an aggregate baseband serial bit stream containing a plurality of digitized time division multiplexed (TDM) baseband channels supplied from a plurality of baseband signal sources, and wherein said received signal contains said aggregate baseband serial bit stream that has been packetized in accordance with motion picture expert group (MPEG)-based transport protocol.

16. A method according to claim 15, wherein step (a) comprises demodulating said second modulated and encoded signal by means of a DVB demodulator, and converting said packetized baseband signal to an aggregate baseband serial bit stream containing said plurality of digitized TDM baseband channels as said intermediate baseband signal.

17. A link adapter interface for communication system receiver that is operative to process a first modulated signal transmitted over a communication link in accordance with a first type of digital phase demodulation mechanism, to derive a baseband information signal, said link adapter interface comprising:

a first signal processor that is operative to process a received signal that has been transported over said communication link in accordance with a prescribed error correction encode mechanism and a second type of digital phase modulation that is effective to increase bandwidth efficiency and/or reduce power usage over said communication link relative to said first type of digital phase modulation, in accordance with a prescribed error correction decode mechanism to derive an intermediate baseband signal representative of said baseband information signal; and a second signal processor that is operative to process said intermediate baseband information signal in accordance with said first type of digital phase modulation to reproduce said first modulated signal, which is coupled to said receiver and demodulated and processed thereby to derive said baseband information signal.

18. A link adapter interface according to claim 17, wherein said second type of digital phase modulation comprises digital video broadcast (DVB) standard modulation.

19. A link adapter interface according to claim 17, wherein said first type of digital phase modulation comprises binary phase shift keyed (BPSK) modulation and said second type of digital phase modulation comprises quaternary phase shift keyed (QPSK) modulation.

20. A link adapter interface according to claim 17, wherein said prescribed error correction encode mechanism comprises Viterbi and Reed-Solomon encoding.

21. A link adapter interface according to claim 17, wherein said baseband signal is comprised of an aggregate baseband serial bit stream containing a plurality of digitized time division multiplexed (TDM) baseband channels supplied from a plurality of baseband signal sources, and wherein said received signal contains said aggregate baseband serial bit stream that has been packetized in accordance with motion picture expert group (MPEG)-based transport protocol.

22. A link adapter interface according to claim 21, wherein said first signal processor includes a DVB demodulator, and a protocol converter which is operative to convert said packetized baseband signal to an aggregate baseband serial bit stream containing said plurality of digitized TDM baseband channels as said intermediate baseband signal.

23. A link adapter interface according to claim 17, further including a switch that is operative to provide a connectivity path for said received signal to said receiver and decoupling said second signal processor from said receiver and, in response to said first signal processor detecting that said received signal contains said second type of digital phase modulation, automatically coupling said second signal processor to said receiver.

24. A link adapter interface according to claim 17, further including a demultiplexer coupled to said first signal processor and having a first output ported to said second signal processor and a second output ported to a baseband signal processor that is operative to process said intermediate baseband signal.

25. A link adapter interface according to claim 17, wherein said first modulated signal is one that has been processed in accordance with a first type of error correction encoding mechanism to derive a first modulated and encoded signal, said receiver is operative to demodulate and process said first modulated and encoded signal to derive said baseband information signal, and said second signal processor is operative to process said intermediate baseband information signal in accordance with said first type of digital phase modulation and said first type of error correction encoding mechanism to reproduce said first modulated and encoded signal.

* * * * *